United States Patent
Lei et al.

(10) Patent No.: US 12,323,255 B2
(45) Date of Patent: Jun. 3, 2025

(54) HARQ-ACK FEEDBACK TIMING FOR SPS PDSCH

(71) Applicant: Lenovo (Beijing) Limited, Beijing (CN)

(72) Inventors: Haipeng Lei, Beijing (CN); Zhi Yan, Beijing (CN); Lianhai Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 133 days.

(21) Appl. No.: 16/638,394

(22) PCT Filed: Aug. 11, 2017

(86) PCT No.: PCT/CN2017/097161
§ 371 (c)(1),
(2) Date: Feb. 11, 2020

(87) PCT Pub. No.: WO2019/028857
PCT Pub. Date: Feb. 14, 2019

(65) Prior Publication Data
US 2020/0374048 A1 Nov. 26, 2020

(51) Int. Cl.
*H04L 1/1829* (2023.01)
*H04L 5/00* (2006.01)
(Continued)

(52) U.S. Cl.
CPC .......... *H04L 1/1854* (2013.01); *H04L 5/0055* (2013.01); *H04W 52/146* (2013.01); *H04W 72/0446* (2013.01)

(58) Field of Classification Search
CPC .. H04L 1/1854; H04L 5/0055; H04W 52/146; H04W 72/0446
See application file for complete search history.

(56) References Cited

U.S. PATENT DOCUMENTS

| | | | |
|---|---|---|---|
| 2002/0009061 A1* | 1/2002 | Willenegger | H04W 52/58 370/252 |
| 2014/0086137 A1* | 3/2014 | Chen | H04L 5/0053 370/312 |

(Continued)

FOREIGN PATENT DOCUMENTS

| | | |
|---|---|---|
| CN | 105122932 A | 12/2015 |
| WO | 2013154276 A1 | 10/2013 |

OTHER PUBLICATIONS

PCT/CN2017/097161, "Notification of Transmittal of the International Search Report and the Written Opinion of the International Searching Authority, or the Declaration", PCT International Searching Authority, Mar. 30, 2018, pp. 1-9.

(Continued)

*Primary Examiner* — Michael Thier
*Assistant Examiner* — Nevena Zecevic Sandhu
(74) *Attorney, Agent, or Firm* — Kunzler Bean & Adamson (57) ABSTRACT

Apparatuses, methods, and systems are disclosed for determining hybrid automatic repeat request acknowledgement ("HARQ-ACK") feedback timing for semi-persistent scheduling ("SPS") physical downlink shared channel ("PDSCH"). One apparatus includes a receiver that receives a radio resource control ("RRC") signal from a base unit and a processor that determines a feedback timing for a SPS PDSCH transmission. The processor uses the RRC signal to determine the feedback timing. The apparatus also includes a transmitter that transmits HARQ-ACK feedback to the base unit in a first slot defined by the feedback timing information. Here, the HARQ-ACK feedback indicates whether the SPS PDSCH transmission was successfully received.

6 Claims, 7 Drawing Sheets

(51) Int. Cl.
*H04W 52/14* (2009.01)
*H04W 72/0446* (2023.01)

(56) References Cited

U.S. PATENT DOCUMENTS

| | | | | |
|---|---|---|---|---|
| 2016/0150462 | A1* | 5/2016 | Yang | H04W 74/0833 370/254 |
| 2018/0019843 | A1* | 1/2018 | Papasakellariou | H04L 1/1812 |
| 2018/0049073 | A1* | 2/2018 | Dinan | H04W 72/0413 |
| 2019/0021085 | A1* | 1/2019 | Mochizuki | H04W 16/32 |
| 2019/0052413 | A1* | 2/2019 | Babaei | H04L 1/1848 |
| 2019/0363842 | A1* | 11/2019 | Fu | H04L 1/1896 |
| 2020/0021976 | A1* | 1/2020 | Shimezawa | H04W 76/27 |
| 2020/0037260 | A1* | 1/2020 | Fu | H04L 27/2646 |
| 2020/0037280 | A1* | 1/2020 | Enbuske | H04L 1/1864 |
| 2020/0260417 | A1* | 8/2020 | Jo | H04W 72/23 |
| 2021/0368503 | A1* | 11/2021 | Jung | H04L 1/1896 |

OTHER PUBLICATIONS

Samsung, "HARQ-ACK Feedback Timing", R1-1708026, 3GPP tSG RAN WG1 Meeting #89, May 15-19, 2017, pp. 1-3.

Samsung, "HARQ-ACK Feedback Timing", R1-1708026, 3GPP TSG RAN WG1 NR Ad-Hoc Meeting, Jun. 26-30, 2017, pp. 1-2.

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.3.0, Jun. 2017, pp. 1-460.

PCT/IB2019/000897, "Notification of Transmittal of the International Search Report and the Written Opinion of the International Searching Authority, or the Declaration", PCT International Searching Authority, Aug. 8, 2019, pp. 1-11.

InterDigital, "BWP operation in unlicensed spectrum", R1-1804680, 3GPP RAN WG1 Meeting #92bis, Apr. 16-20, 2018, pp. 1-4.

Zte, "Discussion on frame structure for NR-U", R1-1806459, 3GPP TSG RAN WG1 Meeting #93, May 21-25, 2018, pp. 1-6.

Zte, "Considerations on channel access procedure for NR-U", R2-1809841, 3GPP TSG RAN WG2 NR AH1807 Meeting, Jul. 2-6, 2018, pp. 1-4.

Vivo, "Potential solutions and techniques for NR unlicensed spectrum", R1-1801557, 3GPP TST RAN WG1 Meeting #92, Feb. 26-Mar. 2, 2018, pp. 1-6.

* cited by examiner

HARQ-ACK FEEDBACK TIMING FOR SPS PDSCH

FIELD

The subject matter disclosed herein relates generally to wireless communications and more particularly relates to determining HARQ-ACK feedback timing for SPS PDSCH.

BACKGROUND

The following abbreviations are herewith defined, at least some of which are referred to within the following description.

Third Generation Partnership Project ("3GPP"), Positive-Acknowledgment ("ACK"), Access and Mobility Management Function ("AMF"), Binary Phase Shift Keying ("BPSK"), Carrier Aggregation ("CA"), Clear Channel Assessment ("CCA"), Control Channel Element ("CCE"), Cyclic Prefix ("CP"), Channel State Information ("CSI"), Common Search Space ("CSS"), Discrete Fourier Transform Spread ("DFTS"), Downlink Assignment Index ("DAI"), Downlink Control Information ("DCI"), Downlink ("DL"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Multiple Input Multiple Output ("MIMO"), Multi User Shared Access ("MUSA"), Narrowband ("NB"), Negative-Acknowledgment ("NACK") or ("NAK"), New Data Indicator ("NDI"), Network Function ("NF"), Next Generation Node B ("gNB"), Non-Orthogonal Multiple Access ("NOMA"), Orthogonal Frequency Division Multiplexing ("OFDM"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Session Management Function ("SMF"), Sounding Reference Signal ("SRS"), Single Carrier Frequency Division Multiple Access ("SC-FDMA"), Shared Channel ("SCH"), Signal-to-Interference-Plus-Noise Ratio ("SINR"), System Frame Number ("SFN"), Semi-Persistent Scheduling ("SPS"), Transport Block ("TB"), Transport Block Size ("TBS"), Time-Division Duplex ("TDD"), Time Division Multiplex ("TDM"), Transmission and Reception Point ("TRP"), Transmission Time Interval ("TTI"), Transmit ("TX"), Uplink Control Information ("UCI"), User Entity/Equipment (Mobile Terminal) ("UE"), Uplink ("UL"), User Plane Function ("UPF"), Universal Mobile Telecommunications System ("UMTS"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

SPS (semi-persistent scheduling) is specified for PDSCH transmission and PUSCH transmission. SPS saves scheduling signaling overhead for periodic service, e.g., VoIP. The SPS periodicity is configured by RRC signaling and one L1 signaling is used to activate the SPS transmission and to provide information such as MCS, frequency resource allocation, PUCCH resource indication for HARQ-ACK transmission, etc. After the activation of SPS transmission, SPS PDSCH or SPS PUSCH can be transmitted periodically without associated PDCCH transmission. Another L1 signaling is used to deactivate the SPS transmission.

In 5G networks, HARQ-ACK feedback timing is dynamically indicated in DCI (e.g., via DL grant) for scheduling PDSCH transmission. As such, there is no fixed HARQ-ACK feedback timing or fixed downlink association set. However, for SPS PDSCH, due to lack of associated PDCCH, the corresponding HARQ-ACK feedback timing cannot be obtained.

BRIEF SUMMARY

Methods for determining HARQ-ACK feedback timing for SPS PDSCH are disclosed. Apparatuses and systems also perform the functions of the methods. The methods may also be embodied in one or more computer program products comprising executable code.

In one embodiment, a method for determining HARQ-ACK feedback timing for SPS PDSCH includes receiving a RRC signal from a base unit and determining a feedback timing for a SPS PDSCH transmission using the RRC signal. The method includes transmitting HARQ-ACK feedback to the base unit in a first slot defined by the feedback timing information. Here, the HARQ-ACK feedback indicates whether the SPS PDSCH transmission was successfully received.

Another method for determining HARQ-ACK feedback timing for SPS PDSCH includes transmitting a RRC signal to a remote unit and determining a feedback timing for a SPS PDSCH transmission, where the feedback timing is determined using the RRC signal. The method also includes receiving HARQ-ACK feedback from the remote unit in a first slot defined by the feedback timing information. Here, the HARQ-ACK feedback indicates whether the SPS PDSCH transmission was successfully received by the remote unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order for a base unit (e.g., a gNB) to communicate HARQ-ACK feedback timing to a remote unit (e.g., to a UE) for SPS PDSCH transmissions in a 5G wireless communication system, the base unit sends a RRC signal to the remote unit. In certain embodiments, this RRC signal is used to configure the SPS transmissions (e.g., a SPS activation signal). The remote unit uses information in the RRC signal to determine the HARQ-ACK feedback timing for SPS PDSCH.

In 5G networks, the HARQ-ACK feedback timing is dynamically indicated in DCI for scheduling PDSCH transmissions. For example, the downlink grant for each dynamically scheduled PDSCH includes an indication of the HARQ-ACK feedback timing for the scheduled PDSCH. However, a SPS PDSCH is not a dynamically scheduled PDSCH and the DCI does not schedule the SPS PDSCH. Thus, the base unit uses the RRC signaling to communicate HARQ-ACK feedback timing for SPS PDSCH. In certain embodiments, the information communicated by RRC signaling is combined with timing information of nearby dynamically scheduled PDSCH to derive the HARQ-ACK feedback timing for SPS PDSCH. As used here, dynamically indicated timing refers to timing information that is sent each time the PDSCH is scheduled. Similarly, a dynamically scheduled PDSCH is one for which each occurrence is scheduled in DCI.

Figure 1:
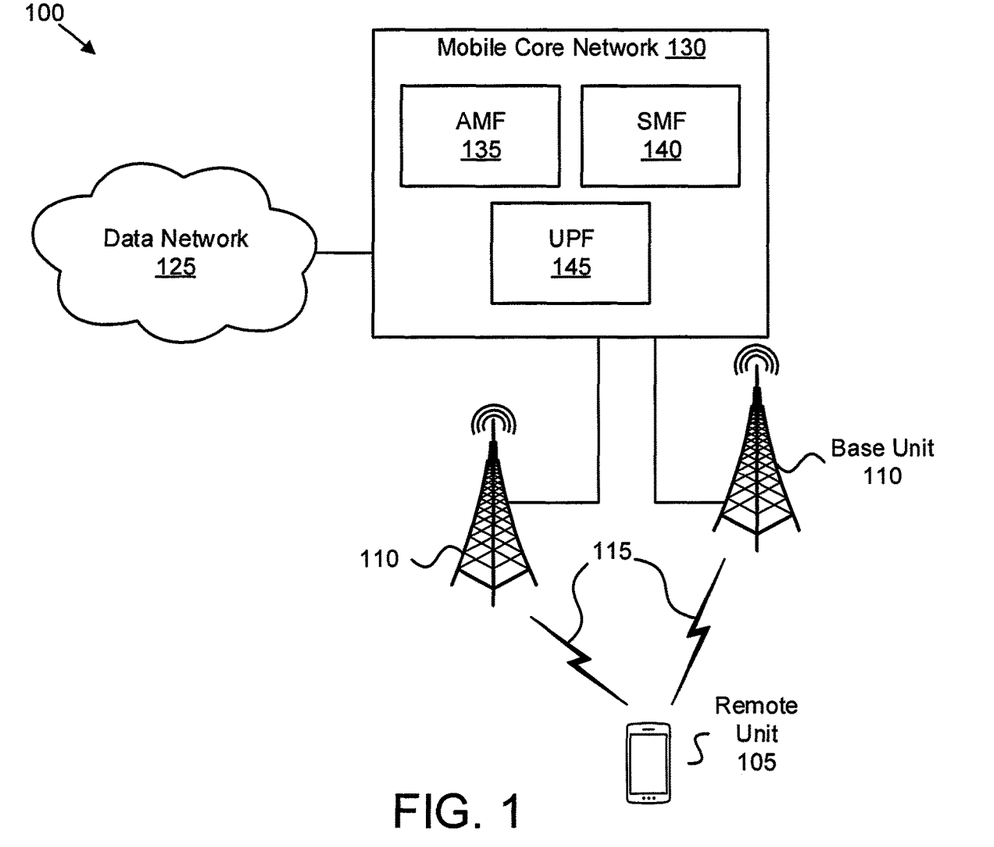
FIG. 1 is a schematic block diagram illustrating one embodiment of a wireless communication system for determining HARQ-ACK feedback timing for SPS PDSCH.

FIG. 1 depicts a wireless communication system 100 for determining HARQ-ACK feedback timing for SPS PDSCH, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE-A or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, user equipment ("UE"), user terminals, a device, or by other terminology used in the art. The remote units 105 may communicate directly with one or more of the base units 110 via uplink ("UL") and downlink ("DL") communication signals, for example a remote unit 105 may send data in a transport block ("TB") to a base unit 110 via UL communication signals and receive data or control signals from the base unit via DL communication signals. Furthermore, the UL and DL communication signals may be carried over the communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN") that may include one or more controllers communicably coupled to one or more corresponding base units 110. The RAN is generally communicably coupled to one or more core networks, which in turn may be coupled to other networks, like the Internet and public switched telephone networks, among other networks. These and other elements of radio access and core networks are not illustrated but are well known generally by those having ordinary skill in the art. The base units 110 connect to the mobile core network 130 via the RAN.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 125, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes an access and mobility management function ("AMF") 135, a session management function ("SMF") 140, and a user plane function ("UPF") 145. Although a specific number of AMFs 135, SMFs 140, and UPFs 145 are depicted in FIG. 1, one of skill in the art will recognize that any number of AMFs 135, SMFs 140, and UPFs 145 may be included in the mobile core network 130.

The AMF 135 provides services such as UE registration, UE connection management, and UE mobility management. The SMF 140 manages the data sessions of the remote units 105, such as a PDU session. The UPF 145 provides user plane (e.g., data) services to the remote units 105. A data connection between the remote unit 105 and a data network 125 is managed by a UPF 145.

As discussed in further detail below, a base unit 110 may indicate, to a remote unit 105, HARQ-ACK feedback timing for SPS PDSCH using a RRC signal. Here, the base unit 110 transmits an RRC signal which is then used by the remote unit 105 to determining a feedback timing for a SPS PDSCH transmission. Note that a SPS PDSCH transmission has no corresponding PDCCH, and thus the base unit 110 cannot indicate the HARQ-ACK feedback timing for SPS PDSCH via PDCCH as it does for dynamically scheduled PDSCHs. In certain embodiments, the HARQ-ACK feedback timing for SPS PDSCH is semi-statically indicated via the RRC signal itself. As used here, the semi-statically indicated timing refers to the timing being valid for more than one instance of the SPS PDSCH (e.g., valid until overridden by a new RRC signal or until SPS termination). In other embodiments, the remote unit 105 uses information in the RRC signal, combined with other information, to derive the HARQ-ACK feedback timing for SPS PDSCH.

Figure 2:
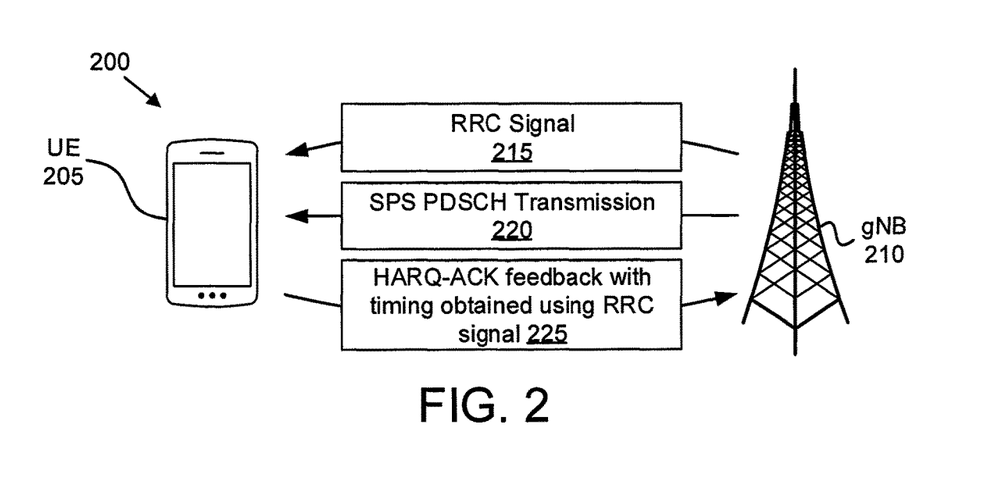
FIG. 2 illustrates one embodiment of a network architecture for determining HARQ-ACK feedback timing for SPS PDSCH.

FIG. 2 depicts a network 200 used for determining HARQ-ACK feedback timing for SPS PDSCH, according to embodiments of the disclosure. The network 200 includes a UE 205 and gNB 210. The network 200 depicts a simplified embodiment of the wireless communication system 100. The UE 205 may be one embodiment of the remote unit 105, while the gNB 210 may be one embodiment of the base unit 110. Here, the gNB 210 may be a gNB or 5G base station. Although only one UE 205 is depicted, in other embodiments the gNB 210 may serve a plurality of UEs 205.

As depicted, the gNB 210 sends an RRC signal 215 and an SPS PDSCH transmission 220 to the UE 205. In a first embodiment, the RRC signal defines a semi-static downlink slot set configuration. The UE 205 identifies a downlink slot set that includes the SPS PDSCH transmission 220. The UE 205 aggregates HARQ-ACK feedback for each PDSCH transmission in the downlink slot set (including the HARQ-ACK feedback for the SPS PDSCH transmission 220). The UE 205 further determines feedback timing for the downlink slot set, for example deriving it from PDSCH transmissions with dynamic timing indication. As used here, dynamic timing indication refers to the feedback timing being indicated each time the PDSCH is scheduled.

In a second embodiment, the UE 205 determines a downlink slot set to which the SPS PDSCH belongs using DAI values of dynamically scheduled PDSCHs located in adjacent slots in the time domain. Here, the gNB 210 updates the DAI with consideration of the SPS PDSCH (e.g., increments the DAI value for the SPS PDSCH), even though the SPS PDSCH is not associated with a DL grant. Again, the UE 205 aggregates HARQ-ACK feedback for each PDSCH transmission in the downlink slot set (including the HARQ-ACK feedback for the SPS PDSCH transmission 220) and determines feedback timing for the downlink slot set.

In a third embodiment, the HARQ-ACK feedback timing for SPS PDSCH is dynamically indicated in a group-common PDCCH. Here, the gNB 210 sends an RRC signal with a SPS-RNTI used by the UE 205 to detect a group-common PDCCH. In a fourth embodiment, the HARQ-ACK feedback timing for SPS PDSCH is semi-statically indicated by the RRC signal (e.g., via the RRC signaling used to configure SPS). Accordingly, the gNB 210 is able to communicate the HARQ-ACK feedback timing for SPS PDSCH to the UE 205, despite the SPS PDSCH not having an associated PDCCH.

Figure 3:
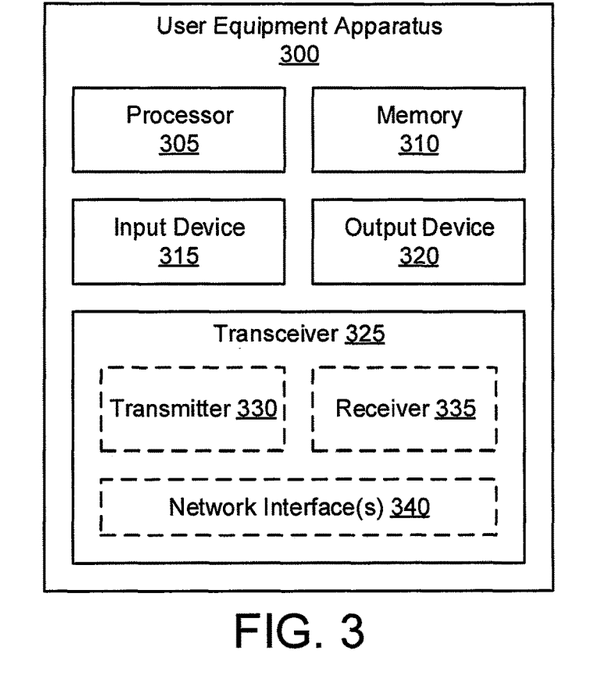
FIG. 3 is a schematic block diagram illustrating one embodiment of a user equipment apparatus for determining HARQ-ACK feedback timing for SPS PDSCH.

FIG. 3 depicts one embodiment of a user equipment apparatus 300 that may be used for determining HARQ-ACK feedback timing for SPS PDSCH, according to embodiments of the disclosure. The user equipment apparatus 300 may be one embodiment of the remote unit 105 and/or the UE 205, described above. Furthermore, the user equipment apparatus 300 may include a processor 305, a memory 310, an input device 315, an output device 320, a transceiver 325 for communicating with one or more base units 110.

As depicted, the transceiver 325 may include a transmitter 330 and a receiver 335. The transceiver 325 may also support one or more network interfaces 340, such as the Uu interface used to communicate with a gNB. In some embodiments, the input device 315 and the output device 320 are combined into a single device, such as a touchscreen. In certain embodiments, the user equipment apparatus 300 may not include any input device 315 and/or output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In some embodiments, the processor 305 controls the receiver 335 to receive a radio resource control ("RRC") signal from a base unit, such as the gNB 210. Additionally, the processor 305 uses the received RRC signal to determine a feedback timing for semi-persistent scheduling ("SPS") physical downlink shared channel ("PDSCH") transmission. As used herein, a "feedback timing" refers to an indication of where HARQ-ACK feedback is to be located in the time domain. For example, the feedback timing may indicate a slot on which the UE apparatus 300 is to transmit its HARQ-ACK feedback for the SPS PDSCH transmission.

As described further herein, additional signals and/or implicit information may be used, in combination with the RRC signal, to indicate the feedback timing. The processor 325 controls the transmitter 330 to transmit the HARQ-ACK feedback to the gNB in a first slot defined by the feedback timing information. The HARQ-ACK feedback indicates whether the SPS PDSCH transmission was both successfully received by the receiver 335 and decoded by the processor 305.

In some embodiments, the RRC signal defines a HARQ-ACK feedback downlink slot set having a set size and a slot offset, wherein the downlink slot set comprises multiple downlink slots and the HARQ-ACK feedback for the downlink slot set corresponds to all downlink transmissions in the set and is transmitted in one UCI. As used herein, a downlink slot set refers to a set of downlink resources (e.g., multiple slots, multiple mini-slots, multiple carriers, etc.). Here, the base station apparatus 400 indicates the size and location of the downlink slot set (also referred to herein as a "bundle window") using the RRC signal. In this embodiment, the feedback timing indicated via RRC signaling comprises the downlink slot set to which the SPS PDSCH belongs. Accordingly, the processor 305 identifies, via the RRC signal, the downlink slot set (or bundle window) to which the SPS PDSCH transmission belongs.

Additionally, the processor 305 receives, via the receiver 335, a timing indication (separate from the feedback timing) in a physical downlink control channel ("PDCCH") for a dynamically scheduled PDSCH transmission in the same downlink slot set as the SPS PDSCH transmission. In certain embodiments, the feedback timing for the dynamically scheduled PDSCH transmission applies to all PDSCHs in the downlink slot set. The processor 305 uses the feedback timing indication to determine the first slot, and controls the transmitter 330 to transmit the HARQ-ACK feedback for all downlink transmissions in the set (including for the SPS PDSCH) on the first slot.

In some embodiments, the RRC signal defines a time-domain location of the SPS PDSCH, wherein processor 305 receives, via the receiver 335, a PDCCH transmission containing both a downlink assignment index ("DAI") and a timing indication for a dynamically scheduled PDSCH transmission located adjacent to the SPS PDSCH in the time domain. Here, the SPS PDSCH transmission and the dynamically scheduled PDSCH transmission are in the same downlink slot set. Again, the downlink slot set includes multiple downlink slots and the HARQ-ACK feedback for the downlink slot set corresponds to all downlink transmissions in the set and is transmitted in one UCI. In such embodiments, the feedback timing for the dynamically scheduled PDSCH transmission applies to all PDSCHs in the downlink slot set, including the SPS PDSCH transmission.

In some embodiments, the RRC signal defines a SPS radio network temporary identifier ("SPS-RNTI"). In such embodiments, the SPS-RNTI is used exclusively for indicating feedback information for SPS PDSCH transmission. Here, the processor 405 controls the radio transceiver 425 to send a group-common PDCCH transmission, with the group-common PDCCH using the SPS-RNTI to indicate the feedback timing for the SPS PDSCH transmission to the UE. In certain embodiments, the RRC signal further configures a UE-specific field index in the group-common PDCCH for the UE to monitor to receive the feedback timing.

In one embodiment, the feedback timing for the SPS PDSCH transmission is included in a portion of the group-common PDCCH used to indicate uplink power adjustment. In another embodiment, the feedback timing for the SPS PDSCH transmission is included in a portion of the group-common PDCCH used to indicate slot format. In one embodiment, the group-common PDCCH dynamically indicates the feedback timing from a set of values which is configured by RRC signaling. In another embodiment, the group-common PDCCH dynamically indicates the feedback timing from a predefined value set.

In some embodiments, the RRC signal defines the feedback timing for the SPS PDSCH transmission without relying on additional information (implicit or expressly signaled). For example, the RRC signal may indicate the feedback timing from a predefined set of values (e.g., from a fixed or previously configured set).

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to determining HARQ-ACK feedback timing for SPS PDSCH. For example, the memory 310 may store downlink slot set information, DAIs, a SPS-RNTI, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes two or more different devices, such as a keyboard and a touch panel. In certain embodiments, the input device 315 may include a camera for capturing images or otherwise inputting visual data.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 communicates with base units 110 of a mobile communication network. The transceiver 325 may include one or more transmitters 330 and one or more receivers 335. As discussed above, the transceiver 325 may support one or more the network interface 340 for communicating with the base unit 110.

Figure 4:
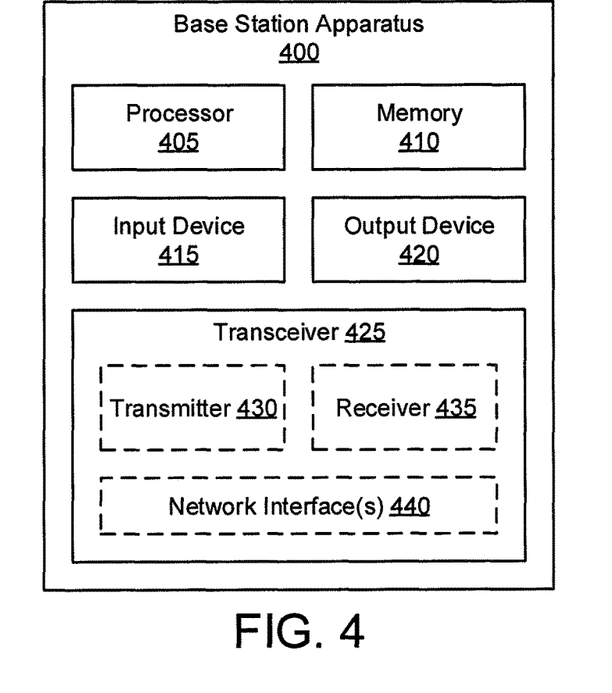
FIG. 4 is a schematic block diagram illustrating another embodiment of a base station apparatus for determining HARQ-ACK feedback timing for SPS PDSCH.

FIG. 4 depicts one embodiment of a base station apparatus 400 that may be used for determining HARQ-ACK feedback timing for SPS PDSCH, according to embodiments of the disclosure. The base station apparatus 400 may be one embodiment of the base unit 110 and/or gNB 210, described above. Furthermore, the base station apparatus 400 may include a processor 405, a memory 410, an input device 415, an output device 420, a transceiver 425 for communicating with one or more remote units 105 and/or a mobile core network 130.

As depicted, the transceiver 425 may include a transmitter 430 and a receiver 435. The transceiver 425 may also support one or more network interfaces 440, such as the Uu interface, N2 interface, N3 interface, and/or other network interfaces suitable for communication with a remote unit and/or core network. In some embodiments, the input device 415 and the output device 420 are combined into a single device, such as a touchscreen. In certain embodiments, the base station apparatus 400 may not include any input device 415 and/or output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the processor 405 controls the radio transceiver 425 to send a RRC signal to a remote unit, such as the UE 205. Additionally, the processor 205 determines a feedback timing for a semi-persistent scheduling ("SPS") physical downlink shared channel ("PDSCH") transmission. As used herein, a "feedback timing" refers to an indication of where HARQ-ACK feedback is to be located in the time domain. For example, the feedback timing may indicate a slot on which the UE is to transmit its HARQ-ACK feedback for the SPS PDSCH transmission (and when the base station apparatus 400 is to receive HARQ-Ack feedback for that UE).

Here, the feedback timing is indicated using the RRC signal. As described further herein, additional signals and/or implicit information may be used, in combination with the RRC signal, to indicate the feedback timing. The UE determines the feedback timing using the RRC signal (and optionally using the additional information) and transmits its HARQ-ACK feedback. The radio transceiver 425 receives the HARQ-ACK feedback from the UE in a first slot defined by the feedback timing information. The HARQ-ACK feedback indicates whether the SPS PDSCH transmission was successfully received by the UE.

In some embodiments, the RRC signal defines a HARQ-ACK feedback downlink slot set having a set size and a slot offset, wherein the downlink slot set comprises multiple downlink slots and the HARQ-ACK feedback for the downlink slot set corresponds to all downlink transmissions in the set and is transmitted in one UCI. As used herein, a downlink slot set refers to a set of downlink resources (e.g., multiple slots, multiple mini-slots, multiple carriers, etc.). Here, the base station apparatus 400 indicates the size and location of the downlink slot set (also referred to herein as a "bundle window") using the RRC signal. In this embodiment, the feedback timing indicated via RRC signaling comprises the downlink slot set to which the SPS PDSCH belongs.

Additionally, the processor 405 controls the radio transceiver 425 to send a timing indication (separate from the feedback timing) in a physical downlink control channel ("PDCCH") for a dynamically scheduled PDSCH transmission in the same downlink slot set as the SPS PDSCH transmission. In certain embodiments, the feedback timing for the dynamically scheduled PDSCH transmission applies to all PDSCHs in the downlink slot set. The UE uses the feedback timing indication to determine the first slot, and transmits the HARQ-ACK feedback for all downlink transmissions in the set (including for the SPS PDSCH) on the first slot.

In certain embodiments, the RRC signal defines a time-domain location of the SPS PDSCH, wherein processor 405 controls the radio transceiver 425 to send a PDCCH transmission containing both a downlink assignment index ("DAI") and a timing indication for a dynamically scheduled PDSCH transmission located adjacent to the SPS PDSCH in the time domain. Here, the SPS PDSCH transmission and the dynamically scheduled PDSCH transmission are in the same downlink slot set. Again, the downlink slot set includes multiple downlink slots and the HARQ-ACK feedback for the downlink slot set corresponds to all downlink transmissions in the set and is transmitted in one UCI. In such embodiments, the feedback timing for the dynamically scheduled PDSCH transmission applies to all PDSCHs in the downlink slot set, including the SPS PDSCH transmission.

In some embodiments, the RRC signal defines a SPS radio network temporary identifier ("SPS-RNTI"). In such embodiments, the SPS-RNTI is used exclusively for indicating feedback information for SPS PDSCH transmission. Here, the processor 405 controls the radio transceiver 425 to send a group-common PDCCH transmission, with the group-common PDCCH using the SPS-RNTI to indicate the feedback timing for the SPS PDSCH transmission to the UE. In certain embodiments, the RRC signal further configures a UE-specific field index in the group-common PDCCH for the UE to monitor to receive the feedback timing.

In one embodiment, the feedback timing for the SPS PDSCH transmission is included in a portion of the group-common PDCCH used to indicate uplink power adjustment. In another embodiment, the feedback timing for the SPS PDSCH transmission is included in a portion of the group-common PDCCH used to indicate slot format. In one embodiment, the group-common PDCCH dynamically indicates the feedback timing from a set of values which is configured by RRC signaling. In another embodiment, the group-common PDCCH dynamically indicates the feedback timing from a predefined value set.

In some embodiments, the RRC signal defines the feedback timing for the SPS PDSCH transmission without relying on additional information (implicit or expressly signaled). For example, the RRC signal may indicate the feedback timing from a predefined set of values (e.g., from a fixed or previously configured set).

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to determining HARQ-ACK feedback timing for SPS PDSCH. For example, the memory 410 may store downlink slot set information, DAIs, a SPS-RNTI, and the like. In some embodiments, the memory 410 also stores program code and related data, such as an operating system or other controller algorithms operating on the remote unit 105 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes two or more different devices, such as a keyboard and a touch panel. In certain embodiments, the input device 415 may include a camera for capturing images or otherwise inputting visual data.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with remote unit within a mobile communication network. The transceiver 425 may also communicate with a core network, such as the mobile core network 130. The transceiver 425 may include one or more transmitters 430 and one or more receivers 435. As discussed above, the transceiver 425 may supports one or more the network interface 440 for communicating with remote units 105 and the mobile core network 130.

Figure 5:
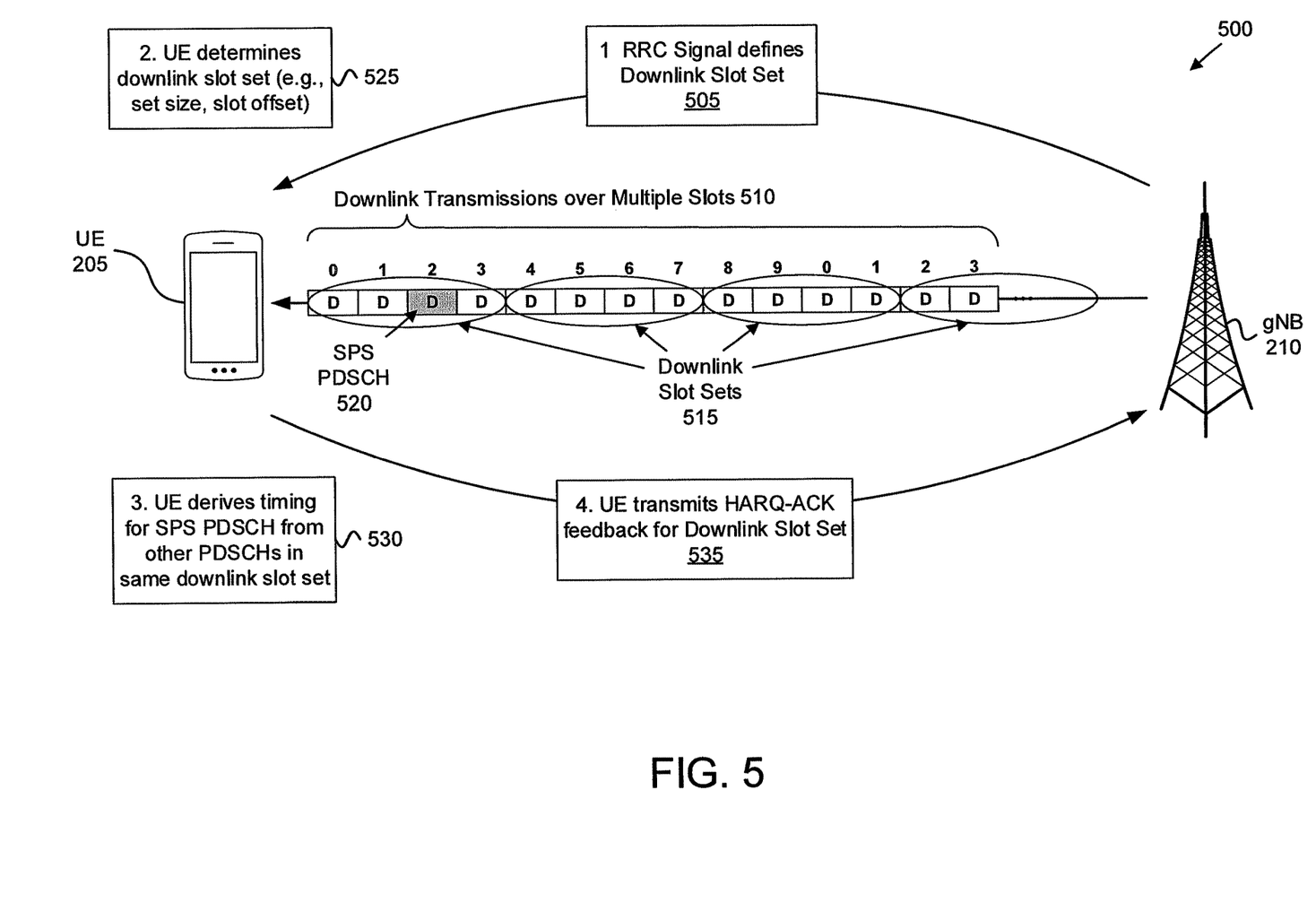
FIG. 5 is a block diagram illustrating one embodiment of HARQ-ACK feedback timing determination for SPS PDSCH.
Figure 6:
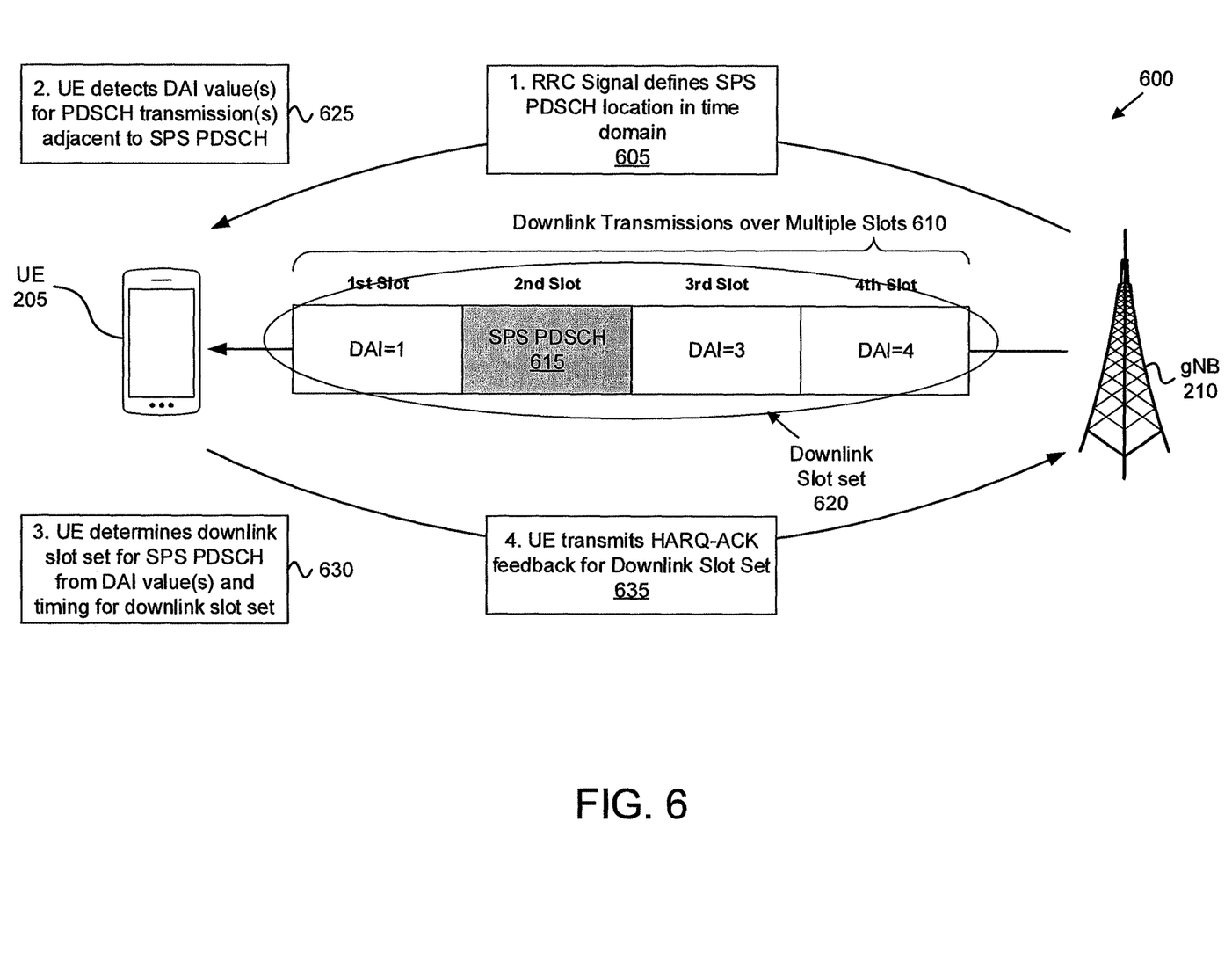
FIG. 6 is a block diagram illustrating another embodiment of HARQ-ACK feedback timing determination for SPS PDSCH.
Figure 7:
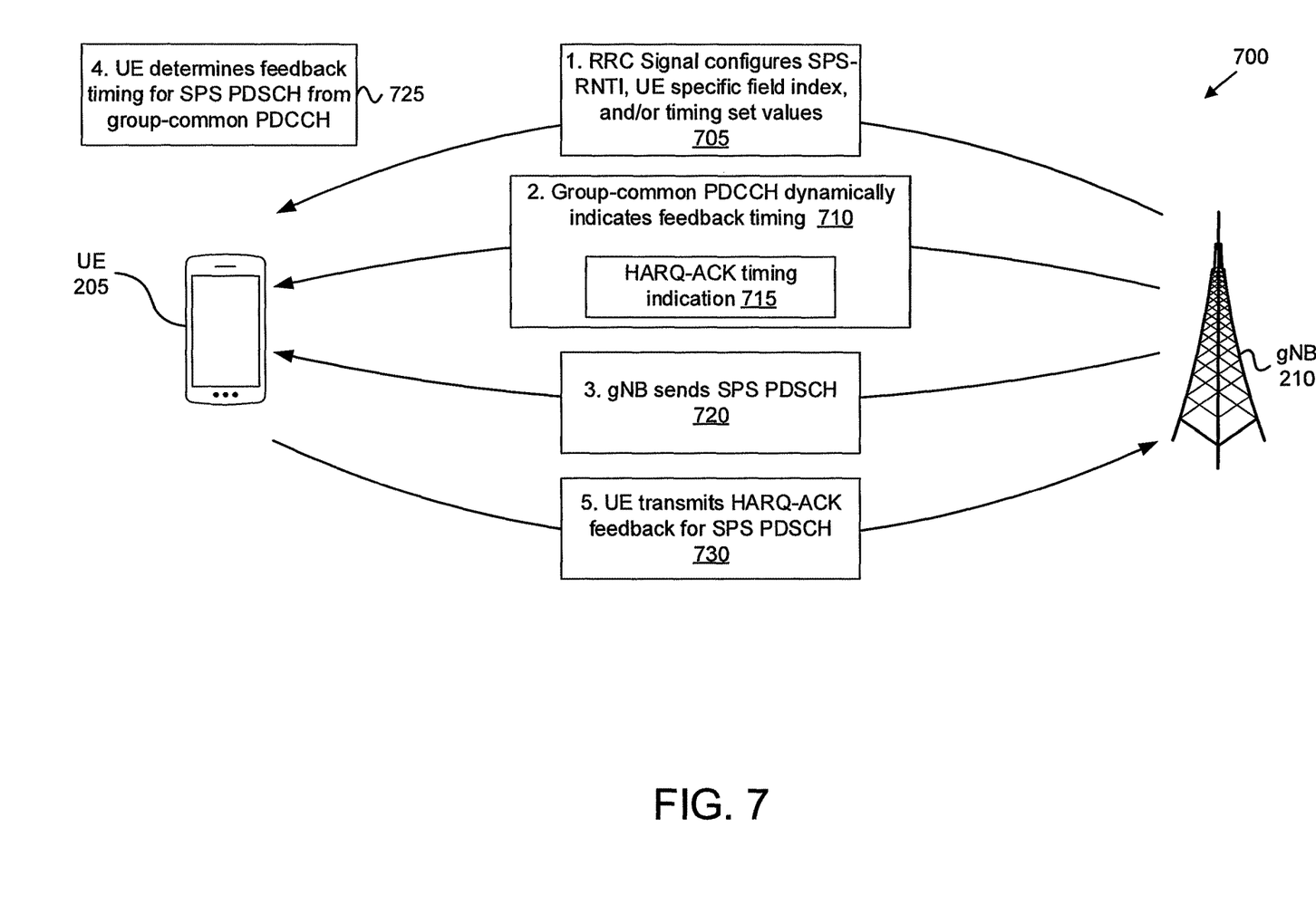
FIG. 7 is a block diagram illustrating a third embodiment of HARQ-ACK feedback timing determination for SPS PDSCH.

FIGS. 5-7 depict various embodiments of procedures for HARQ-ACK feedback timing determination for SPS PDSCH, according to embodiments of the disclosure. Said procedures involve the UE 205 and the gNB 210.

FIG. 5 depicts a first procedure 500 for HARQ-ACK feedback timing determination for SPS PDSCH using a semi-static downlink slot set configuration, according to embodiments of the disclosure. In the first procedure 500, the gNB 205 transmits a RRC signal that defines a downlink slot set (see signaling 505). The downlink slot set (also referred to as a bundle window) includes multiple DL transmissions, depicted here as DL transmissions over multiple slots 510. In other embodiments, the multiple DL transmissions may be over multiple mini-slots, combinations of slots and mini-slots, etc. Here, the downlink slot set includes the SPS PDSCH transmission 520 and at least one dynamically scheduled PDSCH. Within the bundle window, the HARQ-ACK feedback corresponding to all the PDSCHs (including the dynamic PDSCH and SPS PDSCH) transmitted in the multiple slots (and/or multiple mini-slots) are aggregated together and transmitted in one UCI.

The RRC signal defines a bundle window size (e.g., a set size) and a slot offset of the bundle window (downlink slot set). In certain embodiments, the bundle window size is defined in terms of a number of slots. In certain embodiments, the slot offset is defined with respect to frame number, such as SFN=0. As depicted, the DL transmissions over multiple slots 510 are organized into several downlink slot sets 515.

The UE 205 determines the downlink slot set 515 to which the SPS PDSCH transmission 520 belongs using the set size and slot offset (see block 525). Here, a first downlink slot set 515 includes the SPS PDSCH transmission. Because the HARQ-ACK feedback for all the PDSCHs in the same downlink slot set 515 is aggregated, the UE 205 derives the HARQ-ACK feedback timing for the SPS PDSCH transmission 520 from other PDSCHs in the downlink slot set 515 having a dynamic timing indication (see block 530).

Additionally, the UE 205 transmits the HARQ-ACK feedback for the downlink slot set 515 containing the SPS PDSCH 520 to the gNB 210 (see transmission 535). Note that the HARQ-ACK feedback corresponds to all the PDSCHs transmitted in the downlink slot set 515 and is transmitted in one UCI. The first procedure 500 ends.

FIG. 6 depicts a second procedure 600 for HARQ-ACK feedback timing determination for SPS PDSCH using DAI that is updated with consideration of the SPS PDSCH, according to embodiments of the disclosure. In the second procedure 600, the gNB 210 transmits a RRC signal that defines an SPS PDSCH location in the time domain (see signaling 605). Additionally, the gNB transmits DL transmissions over multiple slots 610, the multiple DL transmissions including the SPS PDSCH transmission 615 and at least one dynamically scheduled PDSCH transmission in a slot adjacent to the SPS PDSCH transmission 615 in the time domain. Here, the SPS PDSCH transmission 615 and the at least one dynamically scheduled PDSCH transmission form a downlink slot set 620. As depicted, the downlink slot set 620 includes four slots with DL transmissions in each slot.

In the embodiments of FIG. 6, the dynamically scheduled PDSCH transmissions are associated with a downlink assignment index ("DAI") in the DL grant. Here, the value of the DAI in the DL grant denotes the accumulative number of PDCCH(s) with assigned PDSCH transmission(s) and PDCCH indicating downlink SPS release as well as PDSCH without associated PDCCH (e.g., a SPS PDSCH) up to the present slot within a bundle window (e.g., the downlink slot set 620). The value of DAI is updated from slot to slot. This is a reinterpretation of the conventional DAI which does not increment for a PDSCH without associated PDCCH.

As depicted, the dynamically scheduled PDSCH transmission in the first slot has a DAI value of "1," the dynamically scheduled PDSCH transmission in the third slot has a DAI value of "3," and dynamically scheduled PDSCH transmission in the fourth slot has a DAI value of "4." Here, the SPS PDSCH is scheduled in the second slot of the downlink slot set 620. Accordingly, the SPS PDSCH is implicitly associated with the DAI value of "2" due to its location between a dynamically scheduled PDSCH transmission with a DAI value of "1" and a dynamically scheduled PDSCH transmission with a DAI value of "3." Note that the DAI is not signaled to the UE 205 because there is no PDCCH associated with the SPS PDSCH transmission.

With the RRC configuration, UE 205 knows the exact location of the SPS PDSCH transmission in the time domain and will not miss any SPS PDSCH transmission. Further, the UE 205 detects the DAI values for dynamically scheduled PDSCH transmissions in temporally adjacent slots, such as an immediately previous slot and/or an immediately following slot (see block 625). The UE also determines that the current SPS PDSCH transmission 615 is in the downlink slot set 620 (see block 630). Further, the UE 205 knows that the HARQ-ACK corresponding to the SPS PDSCH is to be aggregated with other HARQ-ACK for the dynamic PDSCHs. In this way, UE can derive the HARQ-ACK feedback timing for SPS PDSCH transmission by determining the HARQ-ACK feedback timing for the downlink slot set 620 (see block 630). Then, at the appropriate time, the UE 205 transmits the HARQ-ACK feedback corresponding to the downlink slot set 620 to the gNB 210 (see transmission 635). The second procedure 600 ends.

FIG. 7 depicts a third procedure 700 for HARQ-ACK feedback timing determination for SPS PDSCH using dynamic indication in a group-PDCCH, according to embodiments of the disclosure. In the third procedure 700, the gNB 210 transmits a RRC signal that configures one or more of a SPS-RNTI, a UE-specific field index, and a set of timing values (see signaling 705).

Here, the gNB 210 dynamically indicates the HARQ-ACK feedback timing corresponding to SPS PDSCH using a group-common PDCCH (see signaling 710). Here, the group-common PDCCH includes a HARQ-ACK feedback timing indication 715. In one embodiment, the HARQ-ACK feedback timing is dynamically indicated from a set of values which is configured by RRC signaling. In another embodiment, the HARQ-ACK feedback timing is dynamically indicated from a predefined value set.

In some embodiments, a SPS-RNTI is configured via RRC signaling for UE to detect the group-common PDCCH. When so configured, the UE 205 has the SPS-RNTI in addition to one or more conventional RNTIs. Moreover, the UE 205 may be configured by the gNB 210 (via RRC signaling) with a UE-specific field index within the group-common PDCCH for the UE 205 to monitor its HARQ-ACK feedback timing indication 715.

In one embodiment, the HARQ-ACK feedback timing indication 715 for SPS PDSCH is included in a group-common PDCCH, which is also used for indicating uplink transmit power adjustment. In another embodiment, the HARQ-ACK feedback timing indication 715 for SPS PDSCH is included in the group-common PDCCH for slot format indication.

The gNB 210 sends the SPS PDSCH transmission (see signaling 720) and the UE 205 determines the HARQ-ACK feedback timing for the SPS PDSCH from the group-common PDCCH (see block 725). Having determined the HARQ-ACK feedback timing for SPS PDSCH, the UE 205 transmits (at the appropriate time) its HARQ-ACK feedback for the SPS PDSCH transmission to the gNB 210 (see signaling 730).

Figure 8:
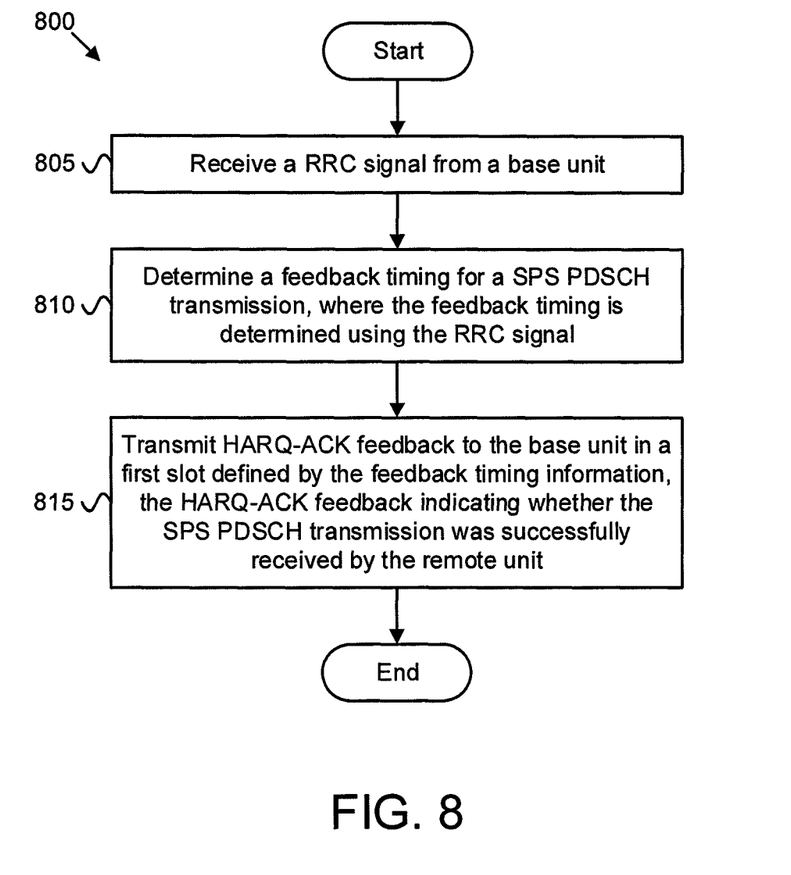
FIG. 8 is a schematic flow chart diagram illustrating one embodiment of a method for determining HARQ-ACK feedback timing for SPS PDSCH.

FIG. 8 is a schematic flow chart diagram illustrating one embodiment of a method 800 for determining HARQ-ACK feedback timing for SPS PDSCH, according to embodiments of the disclosure. In some embodiments, the method 800 is performed by a remote unit, such as the remote unit 105, the UE 205, and/or the user equipment apparatus 300. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a radio resource control ("RRC") signal from a base unit. The method 800 includes determining 810 a feedback timing for a semi-persistent scheduling ("SPS") physical downlink shared channel ("PDSCH") transmission, where the feedback timing is determined using the RRC signal. In certain embodiments, the RRC signal defines the feedback timing for the SPS PDSCH transmission.

In some embodiments, the RRC signal defines a downlink slot set having a set size and a slot offset. Here, the downlink slot set includes multiple downlink slots. Where, the RRC signal defines a downlink slot set, determining 810 the feedback timing may include: identifying a downlink slot set to which the SPS PDSCH transmission belongs, receiving a feedback timing indication from a physical downlink control channel ("PDCCH") for a dynamically scheduled PDSCH transmission in the same downlink slot set as the SPS PDSCH transmission, and determining the first slot based on the timing indication.

In some embodiments, the RRC signal defines a time-domain location of the SPS PDSCH. In such embodiments, determining 810 the feedback timing may include: receiving a downlink assignment index (DAI) and a timing indication from a PDCCH transmission for a dynamically scheduled PDSCH transmission located adjacent to the SPS PDSCH in the time domain, identifying a downlink slot set for the SPS PDSCH from the DAI (where the downlink slot set comprises multiple downlink slots), and determining the first slot based on the timing indication.

In some embodiments, the RRC signal defines a SPS radio network temporary identifier ("SPS-RNTI"). Here, the SPS-RNTI may be used solely to signal feedback timing for the SPS PDSCH transmission to the remote unit. In such embodiments, determining 810 the feedback timing may include detecting a group-common PDCCH transmission using the SPS-RNTI, where the group-common PDCCH indicates the feedback timing for the SPS PDSCH transmission. In one embodiment, the feedback timing for the SPS PDSCH transmission is included in a portion of the group-common PDCCH used to indicate uplink power adjustment. In another embodiment, the feedback timing for the SPS PDSCH transmission is included in a portion of the group-common PDCCH used to indicate slot format. In certain embodiments, the SPS-RNTI is used to trigger HARQ-ACK feedback reporting for the SPS PDSCH transmission.

In some embodiments, the RRC signal further configures a user equipment ("UE") specific field index for UE monitoring the feedback timing in the group-common PDCCH. In one embodiment, the group-common PDCCH indicates the feedback timing from a set of values which is configured by RRC signaling. In another embodiment, the group-common PDCCH indicates the feedback timing from a predefined value set (e.g., a fixed value set).

The method 800 includes transmitting 815 hybrid automatic repeat request acknowledgement ("HARQ-ACK") feedback to the base unit in a first slot defined by the feedback timing information. Here, the HARQ-ACK feedback indicates whether the SPS PDSCH transmission was successfully received. In certain embodiments, the SPS PDSCH is a part of a downlink slot set. In such embodiments, the HARQ-ACK feedback for the downlink slot set may correspond to all downlink transmissions in the set and is transmitted in one uplink control information ("UCI"). For example, the HARQ-ACK feedback may include ACK/NAK feedback for the SPS PDSCH transmission as well as ACK/NAK feedback for all dynamically scheduled PDSCH transmissions in the downlink slot set. The method 800 ends.

Figure 9:
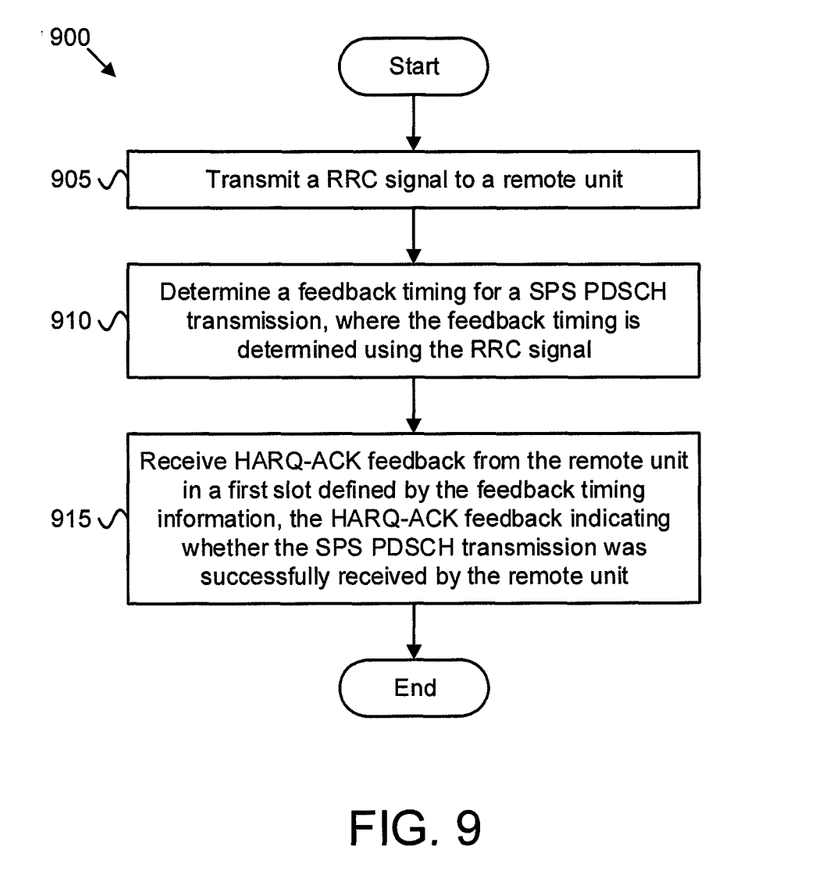
FIG. 9 is a schematic flow chart diagram illustrating another embodiment of a method for determining HARQ-ACK feedback timing for SPS PDSCH.

FIG. 9 is a schematic flow chart diagram illustrating one embodiment of a method 900 for determining HARQ-ACK feedback timing for SPS PDSCH, according to embodiments of the disclosure. In some embodiments, the method 900 is performed by a base unit, such as the base unit 110, the gNB 210, and or the base station apparatus 400. In certain embodiments, the method 900 may be performed by a processor executing program code, for example, a microcontroller, a microprocessor, a CPU, a GPU, an auxiliary processing unit, a FPGA, or the like.

The method 900 begins and transmits 905 a radio resource control ("RRC") signal to a remote unit. The method 900 includes determining 910 a feedback timing for a semi-persistent scheduling ("SPS") physical downlink shared channel ("PDSCH") transmission, where the feedback timing is determined using the RRC signal. In certain embodiments, the RRC signal defines the feedback timing for the SPS PDSCH transmission.

In some embodiments, the RRC signal defines a downlink slot set having a set size and a slot offset. Here, the downlink slot set includes multiple downlink slots. Where, the RRC signal defines a downlink slot set, determining 910 the feedback timing may include: identifying a downlink slot set to which the SPS PDSCH transmission belongs, receiving a feedback timing indication from a physical downlink control channel ("PDCCH") for a dynamically scheduled PDSCH transmission in the same downlink slot set as the SPS PDSCH transmission, and determining the first slot based on the timing indication.

In some embodiments, the RRC signal defines a time-domain location of the SPS PDSCH. In such embodiments, determining 910 the feedback timing may include: receiving a downlink assignment index (DAI) and a timing indication from a PDCCH transmission for a dynamically scheduled PDSCH transmission located adjacent to the SPS PDSCH in the time domain, identifying a downlink slot set for the SPS PDSCH from the DAI (where the downlink slot set comprises multiple downlink slots), and determining the first slot based on the timing indication.

In some embodiments, the RRC signal defines a SPS radio network temporary identifier ("SPS-RNTI"). Here, the SPS-RNTI may be used solely to signal feedback timing for the SPS PDSCH transmission to the remote unit. In such embodiments, determining 910 the feedback timing may include detecting a group-common PDCCH transmission using the SPS-RNTI, where the group-common PDCCH indicates the feedback timing for the SPS PDSCH transmission. In one embodiment, the feedback timing for the SPS PDSCH transmission is included in a portion of the group-common PDCCH used to indicate uplink power adjustment. In another embodiment, the feedback timing for the SPS PDSCH transmission is included in a portion of the group-common PDCCH used to indicate slot format. In certain embodiments, the SPS-RNTI is used to trigger HARQ-ACK feedback reporting for the SPS PDSCH transmission.

In some embodiments, the RRC signal further configures a user equipment ("UE") specific field index for UE monitoring the feedback timing in the group-common PDCCH. In one embodiment, the group-common PDCCH indicates the feedback timing from a set of values which is configured by RRC signaling. In another embodiment, the group-common PDCCH indicates the feedback timing from a predefined value set (e.g., a fixed value set).

The method 900 includes receiving 915 hybrid automatic repeat request acknowledgement ("HARQ-ACK") feedback from the remote unit in a first slot defined by the feedback timing information. Here, the HARQ-ACK feedback indicates whether the SPS PDSCH transmission was successfully received by the remote unit. In certain embodiments, the SPS PDSCH is a part of a downlink slot set. In such embodiments, the HARQ-ACK feedback for the downlink slot set may correspond to all downlink transmissions in the set and is transmitted in one uplink control information ("UCI"). For example, the HARQ-ACK feedback may include ACK/NAK feedback for the SPS PDSCH transmission as well as ACK/NAK feedback for all dynamically scheduled PDSCH transmissions in the downlink slot set. The method 900 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
    at least one memory; and
    at least one processor coupled with the at least one memory and configured to cause the UE to:
    receive a radio resource control ("RRC") signal from a base unit for configuring a semi-persistent scheduling ("SPS") Radio Network Temporary Identifier ("RNTI"), wherein the RRC signal further comprises a plurality of candidate timing values;
    detect a group-common physical downlink control channel ("PDCCH") transmission, wherein the group-common PDCCH transmission comprises a Slot Format Indicator ("SFI") field;
    select a timing value from the plurality of candidate timing values based on a timing indicator in the SFI field of the group-common PDCCH transmission;
    determine a feedback timing for a SPS physical downlink shared channel ("PDSCH") transmission associated with the SPS RNTI, where the feedback timing is determined based at least in part on the selected timing value, and wherein the SPS PDSCH transmission has no corresponding PDCCH transmission to indicate the feedback timing; and
    transmit hybrid automatic repeat request acknowledgement ("HARQ-ACK") feedback to the base unit in a first slot defined by the feedback timing, the HARQ-ACK feedback indicating whether the SPS PDSCH transmission was successfully received.

2. The UE of claim 1, wherein the RRC signal further configures a UE specific field index for UE monitoring the feedback timing in the group-common PDCCH transmission.

3. A method performed by a user equipment ("UE"), the method comprising:
    receiving a radio resource control ("RRC") signal from a base unit for configuring a semi-persistent scheduling ("SPS") Radio Network Temporary Identifier ("RNTI"), wherein the RRC signal further comprises a plurality of candidate timing values;
    detecting a group-common physical downlink control channel ("PDCCH") transmission, wherein the group-common PDCCH transmission comprises a Slot Format Indicator ("SFI") field;
    selecting a timing value from the plurality of candidate timing values based on a timing indicator in the SFI field of the group-common PDCCH transmission;
    determining a feedback timing for a SPS physical downlink shared channel ("PDSCH") transmission associated with the SPS RNTI, where the feedback timing is determined based at least in part on the selected timing value, and wherein the SPS PDSCH transmission has no corresponding PDCCH transmission to indicate the feedback timing; and transmitting hybrid automatic repeat request acknowledgement ("HARQ-ACK") feedback to the base unit in a first slot defined by the feedback timing, the HARQ-ACK feedback indicating whether the SPS PDSCH transmission was successfully received.

4. The method of claim 3, wherein the RRC signal further configures a UE specific field index for UE monitoring the feedback timing in the group-common PDCCH transmission.

5. A processor for wireless communication, comprising:
at least one controller coupled with at least one memory and configured to cause the processor to:
receive a radio resource control ("RRC") signal from a base unit for configuring a semi-persistent scheduling ("SPS") Radio Network Temporary Identifier ("RNTI"), wherein the RRC signal further comprises a plurality of candidate timing values;
detect a group-common physical downlink control channel ("PDCCH") transmission, wherein the group-common PDCCH transmission comprises a Slot Format Indicator ("SFI") field;
select a timing value from the plurality of candidate timing values based on a timing indicator in the SFI field of the group-common PDCCH transmission;
determine a feedback timing for a SPS physical downlink shared channel ("PDSCH") transmission associated with the SPS RNTI, where the feedback timing is determined based at least in part on the selected timing value, and wherein the SPS PDSCH transmission has no corresponding PDCCH transmission to indicate the feedback timing; and
transmit hybrid automatic repeat request acknowledgement ("HARQ-ACK") feedback to the base unit in a first slot defined by the feedback timing, the HARQ-ACK feedback indicating whether the SPS PDSCH transmission was successfully received.

6. The processor of claim 5, wherein the RRC signal further configures a user equipment ("UE") specific field index for monitoring the feedback timing in the group-common PDCCH transmission.

* * * * *